(12) United States Patent
Hido et al.

(10) Patent No.: US 8,588,531 B2
(45) Date of Patent: Nov. 19, 2013

(54) GRAPH SIMILARITY CALCULATION SYSTEM, METHOD AND PROGRAM

(75) Inventors: Shohei Hido, Kanagawa-Ken (JP); Hisashi Kashima, Tokyo-To (JP)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 13/377,445

(22) PCT Filed: Jun. 9, 2010

(86) PCT No.: PCT/JP2010/059795
§ 371 (c)(1),
(2), (4) Date: Dec. 9, 2011

(87) PCT Pub. No.: WO2011/001806
PCT Pub. Date: Jan. 6, 2011

(65) Prior Publication Data
US 2012/0093417 A1    Apr. 19, 2012

(30) Foreign Application Priority Data

Jun. 30, 2009    (JP) ................................. 2009-155060

(51) Int. Cl.
*G06K 9/46*    (2006.01)

(52) U.S. Cl.
USPC ........................................................ 382/190

(58) Field of Classification Search
USPC .................................. 382/190, 203, 220, 223
See application file for complete search history.

(56) References Cited

U.S. PATENT DOCUMENTS 6,473,881 B1   10/2002   Lehner et al.

FOREIGN PATENT DOCUMENTS

| JP | 07-334366 A | 12/1995 |
|---|---|---|
| JP | 7334366 A | 12/1995 |
| WO | WO2008083447 A1 | 7/2008 |

OTHER PUBLICATIONS

Abe, S., "Introduction of Support Vector Machines for Pattern Classification-VI: Current Topics" Institute of Systems, Control and Information Engineers, vol. 53, No. 5. May 2009. pp. 41-46.

Hido, S., et al. "A Fast Graph Kernel Using Neighborhood Hash" Technical report on Information-Based Induction Sciences (IBIS 2009). Oct. 2009. (8 Pages) http://ibis-workshop.org/2009/pdf-ip-pan/82.pdf.

Hido, S., et al. "A Linear-Time Graph Kernel" Proceedings of the 9th IEEE International Conference on Data Mining (ICDM 2009), Dec. 2009. pp. 179-188. http://www.trl.ibm.com/people/hido/pdf/Hido_CDM2009_GraphKernel.pdf.

(Continued)

*Primary Examiner* — Duy M Dang
(74) *Attorney, Agent, or Firm* — Tutunjian & Bitetto, P.C.; Eustus D. Nelson (57) ABSTRACT

A computer implemented method and system for calculating a degree of similarity between two graphs whose nodes are respectively given discrete labels include providing, for each of the two graphs, label values respectively to a given node and nodes adjacent thereto so that different ones of the discrete labels correspond to different ones of the label values. The nodes are sequentially tracing for each of the two graphs, and, during the tracing of the nodes, a new label value is calculated through a hash calculation using a label value of a currently visited node and also using label values of nodes adjacent to the currently visited node to update the label value to the currently visited node. The degree of similarity between the two graphs is calculated on the basis of the number of the label values having been given to nodes of the two graphs and agreeing between the two graphs.

18 Claims, 10 Drawing Sheets

(56) References Cited

OTHER PUBLICATIONS

Portegys, T., "General Graph Identification With Hashing" School of Information Technology, Illinois State University, Normal, Illinois, 61790, USA. Technical Report, 2008. (10 Pages) http://www.itk.ilstu.edu/faculty/portegys/research/graph/graph-hash.pdf.

Wada, T., et al. "Feature Extraction System Using Similarity Measure Based on Substructure Distribution Analysis" Journal of the DBSJ, vol. 7, No. 1. Jun. 2008. pp. 187-192.

Ishibashi, K., et al., "Detection Technologies of Microscopic Traffic Anomalies : Inspired from Lange Communication Graph" IEICE Transactions, The Institute of Electronics Information and Communication Engineers, vol. 91, No. 10. Oct. 2008. pp. 886-890.

Sakamoto, T., et al., "Improvement on the calculation of similarity using a link structure" The Institute of Electronics, Information, and Communication Engineering, proceedings of the 18th Data Engineering Workshop, Japan, Special Research Committee of Data Engineering of the Institute of Electronics, Information, and Communication Engineering. Jun. 2007. (7 pages).

| | | | |
|---|---|---|---|
| (a) | ORIGINAL GRAPH | A-B-C-B (graph) | A-B-B-C (graph) |
| (b) | BIT-STRING EXPRESSION (4) (LEVEL 1) | A #1000<br>B C #0101<br>#1100<br>B #0101 | A #1000<br>B B #0101<br>#0101<br>C #1100 |
| (c) | AFTER FIRST HASH CALCULATION (4) (LEVEL 2) | E #0100<br>G H #1101<br>#1100<br>I #0001 | F #1001<br>G G #1101<br>#1101<br>J #1011 |
| (d) | AFTER SECOND HASH CALCULATION (4) | ... | ... |
| ⋮ | ⋮ | ⋮ | ⋮ |

GRAPH SIMILARITY CALCULATION SYSTEM, METHOD AND PROGRAM

TECHNICAL FIELD

This invention relates to a technique of calculating or evaluating, on a computer, a degree of similarity between objects, each having a data structure expressed in the form of a graph.

BACKGROUND

A graph is a mathematical subject composed of apexes (which are also called nodes), and sides (which are also called edges, branches or links) connecting the apexes. The apexes have labels that are used for the apexes to be differentiated from one another. In considering such subjects in realistic cases, it can be found that, for example, a road map, a chemical formula and the like are expressed as graphs.

For example, in a road map, intersections can be assumed as nodes, and roads can be assumed as edges. In a chemical formula, elements can be assumed as nodes, and bonds between elements can be assumed as edges. In this context, it can be found that graphs are applicable to a very wide range of fields such as genes, protein structures, electric circuits, geology and architectonics.

Recently, a graph structure has started to be applied even to a social networking service (SNS). That is, a specific state of an SNS can be expressed in a graph with the assumptions that individual users of the SNS are nodes, and that relationships or the like between those users and between others are edges. In the same sense, a link structure of the World Wide Web (WWW) can be also expressed in a graph.

When realistic subjects are thus expressed in the form of graphs, it is naturally desired that whether or not two graphs coincide with or resemble each other be evaluated. For example, if a graph of a chemical formula of some medicine is evaluated as resembling a graph of a chemical formula of another medicine, it is possible to estimate that these two medicines have similar medicinal effects.

According to past studies, however, a polynomial time algorithm has not been known with respect to a problem of determining whether or not two graphs are the same, and an algorithm used for determining whether or not some graph is contained in another graph is also NP complete.

Such algorithms can give solutions in reasonable computation times for graphs only having relatively low numbers of nodes. However, the numbers of nodes are as large as several thousands to several tens of thousands in a case of bioinformatics dealing with gene sequences, and as large as several millions in an SNS, and therefore far exceed the extent that can be handled by a realistic calculation amount of a naive similarity calculation technique.

To solve this, there have been heretofore proposed techniques used for calculating sameness or similarity between two graphs at high speed.

"General Graph Identification With Hashing" by Thomas E. Portegys, School of Information Technology, Illinois State University (http://www.itk.ilstu.edu/faculty/portegys/research/graph/graph-hash.pdf) discloses a technique of determining sameness of two graphs at high speed by using a technique called MD5 hashing. This technique, however, allows only determination on sameness of graphs, and cannot be applied to calculations of a degree of similarity therebetween.

Particularly with respect to producing hash values associated with a relevant graph, Japanese Unexamined Patent Application Publication No. Hei 7-334366 discloses that, while a hash table operable to store hash values of all of partial graphs of a graph S is retained, combinations of partial graphs having existed in the past and partial graphs reached through reduction of the foregoing partial graphs are stored. However, hash values are given by use of a recursive approach in this technique, and therefore, this technique can be applied to a directed acyclic graph but not to a more general graph including a loop.

U.S. Pat. No. 6,473,881 discloses a technique of causing a transistor-level design automation tool to carry out pattern matching for a circuit design through timing analysis, checking of electrical rules, noise analysis and the like. However, this technique uses characteristics such as a keynode that is particular to a circuit, and thus it is difficult to expand its use to general graph comparison.

SUMMARY

Accordingly, this invention provides a graph comparison technique that makes it possible to figure out a degree of similarity between graphs for an SNS, links in the WWW or the like in a reasonable computation time, the graphs having extremely large numbers of nodes.

The abovementioned problem can be highly advantageously solved by this invention. To begin, this invention premises that data used for graphs to be compared is expressed by use of any one of publicly known data structures, such as a matrix expression and a list expression, used for graph expression, and is stored on a storage device such as a hard disk of a computer.

It is assumed that, while nodes of each of the graphs individually have their own labels, the labels have discrete values. For example, in a case of genes, the labels are four kinds that include adenine, thymine, guanine and cytosine. In a case of protein, the labels include twenty kinds of amino acid that are glycine, tryptophan, isoleucine, and so on. In a case of a chemical formula, the labels are at most about 100 kinds that are hydrogen, helium, lithium, beryllium, boron, carbon, nitrogen, oxygen and so on.

According to this invention, nodes are given values unique to the labels of the nodes. Preferably, each of these values is a fixed-length bit string.

A length of the bit string here is selected so as to have the number of digits that is sufficiently larger than the number of digits that is enough to express kinds of labels. The length is thus selected so that a possibility of later-described hash collision can be reduced.

With these preparations, a system according to this invention sequentially visits nodes of each of the graphs by using an existing graph search technique such as depth-first order search, breath-first order search or the like. In the visiting, when staying at one node, the system according to this invention performs calculations on bit-string label values of all of nodes adjacent to the one node, and a bit-string label value of the one node, thereby calculating bit-string values. The system according to this invention performs a hash calculation using the calculated bit-string values and the bit-string label value originally held by the one node, thereby calculating another bit-string label value and setting this bit-string label value as a new label value of the one node.

Thus, when the system finishes visiting all of the nodes in one of the graphs, label values of all of the nodes finishes being rewritten. When the system finishes performing the same processing on the other one of the graphs to be compared for graph similarity, label values of all of the nodes finish being rewritten in the other graph.

Then, the degree of similarity can be obtained, for example, by calculating a percentage of the number of nodes, which have label values agreeing with label values of nodes in the other graph, to all of the nodes in the one graph. A slightly more complex similarity calculation method will be described in a later-described embodiment.

According to the present invention, any one of plural methods can be used as a method of calculating a new label value of a relevant node on the basis of label values of nodes adjacent thereto.

One of the plural methods is to calculate an XOR of two values and then set the calculation result as a new label value of the relevant node, the two values being one obtained by XORing all of label values of the adjacent nodes, and one obtained through bit-rotation of a label value of the relevant node.

Another one of the plural methods is to: if the same label value consecutively appears after sorting label values of all of the adjacent nodes, let one label value represent corresponding labels; add to label values the numbers of times the same label values consecutively appear (referred to as counted values); calculate an XOR of two values that are one obtained by XORing all of the adjacent nodes, and one obtained through bit rotation of a label value of the relevant node; and set the calculation result as a new label value of the relevant node.

In the present invention, any one of other various methods of calculating a new label value of a relevant node on the basis of label values of nodes adjacent thereto and a label value of the relevant node can be used.

According to this invention, a degree of similarity between graphs is calculated based on label values obtained as a result of calculations in each of which a hash value of label values of one node and nodes adjacent thereto is set to a new label value of the one node. Thereby, an effect of enabling a high speed calculation of the degree of similarity between the graphs can be obtained with a calculation amount of the order of $O(N^2)$ or less, where the number of nodes of each of the graphs is denoted as N. Since other known graph similarity comparison techniques require calculation amounts of the exponential order and the like, which are at least about $O(N^3)$, this invention has a large effect of increasing the calculation speed particularly in cases where N is large.

Additionally, since the calculation properly reflects label values of the adjacent nodes, reliability of the degree of similarity obtained as a result is high as well. Nodes of each of graphs are given values unique to labels of the nodes. These values are fixed-length bit strings, preferably. A length of each of the bit strings is selected so as to be a number sufficiently larger than the number of digits that is enough to express kinds of labels. The nodes of each of the graphs are sequentially visited by use of an existing graph search technique such as depth-first order search, breath-first order search or the like. In the visiting, when staying at one node, a system of this invention calculates bit-string values by performing calculations on bit-string label values of all of nodes adjacent to the one node, and on a bit-string label value of the one node. The system of this invention performs a hash calculation using the thus calculated bit-string values and the bit-string label value originally held by the one node, thereby calculating another bit-string label value and setting this bit-string label value as a new label value of the one node. Thus, when the system finishes visiting all of the nodes in one of the graphs, label values of all of the nodes finish being rewritten. When the system finishes performing the same processing on the other one of the graphs to be compared for graph similarity, label values of all of the nodes finish being rewritten in the other graph. Then, the degree of similarity can be figured out by calculating a percentage of the number of nodes, which have label values agreeing with label values of nodes in the other graph, to all of the nodes in the one graph.

DESCRIPTION OF EMBODIMENTS

An embodiment of this invention will be described below based on the drawings. Unless otherwise stated, the same reference numerals refer to the same subjects throughout the drawings. It should be understood that, since illustrative embodiments of the present invention are described below, there is no intention to limit the invention to content described through these embodiments.

Figure 1:
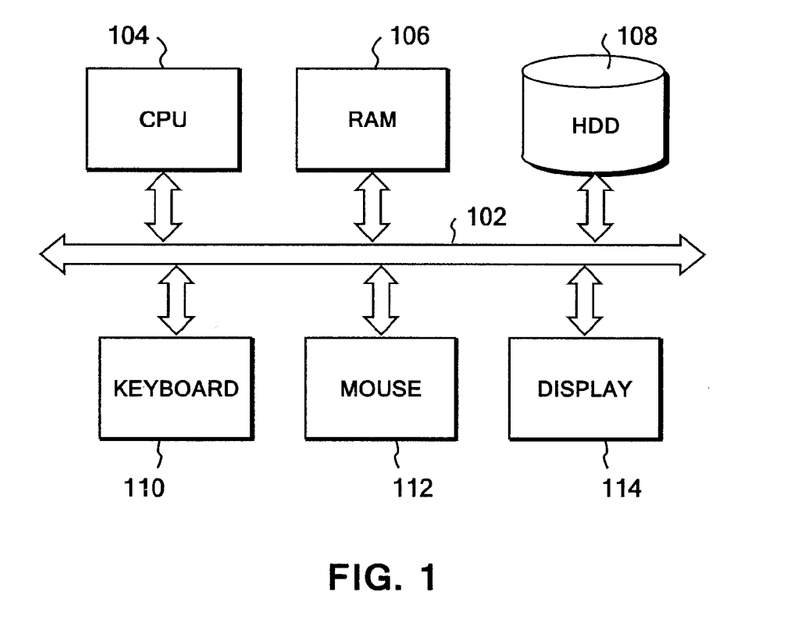
FIG. 1 is a block diagram of a hardware configuration used for carrying out the present invention.

Referring to FIG. 1, there is shown a block diagram of computer hardware used for realizing a system configuration and processing according to the one embodiment of the present invention. In FIG. 1, a CPU 104, a main memory (RAM) 106, a hard disk drive (HDD) 108, a keyboard 110, a mouse 112 and a display 114 are connected to a system path 102. The CPU 104 is preferably based on a 32-bit or 64-bit architecture, and any one of Pentium™ 4, Core™ 2 Duo™ and Xeon™ of Intel Corporation™, Athlon™ of AMD™, and the like may be used as the CPU 104. The main memory 106 preferably has a capacity of at least 2 gigabytes. It is desirable that the hard disk drive 108 has a capacity of, for example, at least 320 gigabytes so as to store therein a large amount of graph data.

Although not individually illustrated, an operating system is previously stored on the hard disk drive 108. The operating system may be any one, such as Linux™, Windows XP™ or Windows™ 2000 of Microsoft Corporation™, or Mac OS™ of Apple Inc.™, that is compatible with the CPU 104.

Moreover, the hard disk drive 108 also stores therein a programming language processor for C, C++, C#, Java™ or the like. This programming language processor is used for generating and retaining later-described modules or tools used for graph data processing.

The hard disk drive 108 may further include: a text editor for writing source code to be compiled by the programming language processor; and a development environment such as Eclipse™.

The keyboard 110 and the mouse 112 are used for initiating the operating system or a program (not shown) that is loaded into the main memory 106 from the hard disk drive 108 and then displayed on the display 114 for typing characters.

The display 114 is preferably a liquid crystal display, and, for example, one having an arbitrary resolution, such as XGA (1024-by-768 resolution) or UXGA (1600-by-1200 resolution). Although not illustrated, the display 114 is used for displaying graph data that should be processed and a degree of similarity between graphs.

Figure 2:
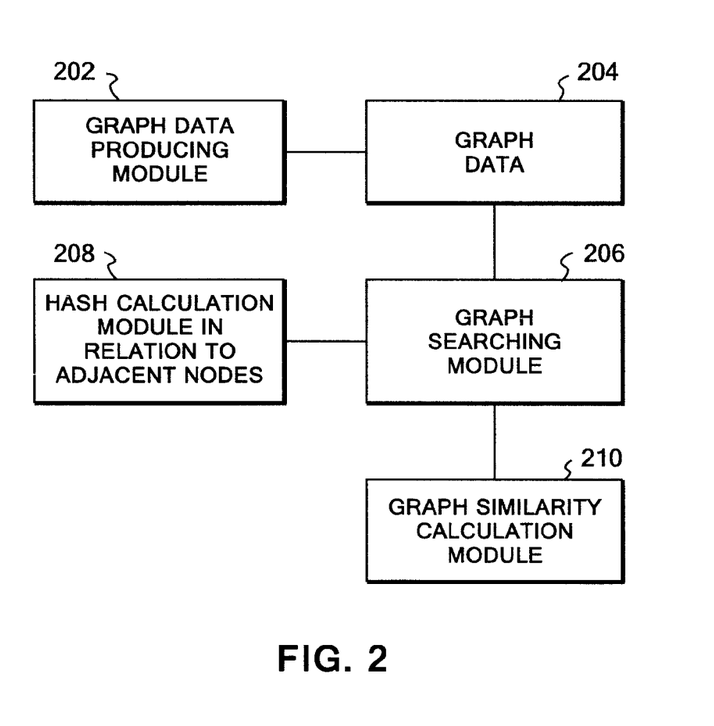
FIG. 2 is a functional and logical block diagram according to the present invention.

FIG. 2 is a functional block diagram of processing modules according to the present invention. These modules are written in any one of existing programming languages such as C, C++, C# and Java™ and then stored in the hard disk drive 108 in an executable binary form. Then, in response to an operation of the keyboard 110 or the mouse 112, the operating system (not shown) causes these modules to be invoked in the main memory 106 and then executed.

A graph data producing module 202 converts a given graph into a computer-readable data structure. In the conversion, for example, the following data structures are used for a graph g with the number of nodes and the average number of adjacent nodes being denoted as n and d, respectively.

g.nodelist: a list denoting a list of the nodes and having a length of n, g.labellist: a list denoting a list of node labels and having a length of n, g.labellistx: a list having the same data structure as g.labellist, being used as a buffer into which labels are written, and having a length of n, and g.adjacencymatrix: an adjacent matrix of the graph, the adjacent matrix having an element (i,j) thereof set to 1 if there is a link between nodes i and j, and set to 0 otherwise, and having a size of n×n although the size can be reduced to n×d by use of a data structure named a sparse array in which elements being 0 are omitted.

Here, with the number of different kinds of labels of nodes being denoted as p, each of the labels is set to m-bit data by selecting m satisfying a condition such as $p \ll 2^m$. The reason for taking $2^m$, which is sufficiently larger than p, is that a possibility of hash collision among the labels should be reduced.

With the above premises, a prime number P1 satisfying, for example, $2^{m-1} < P1 < 2^m$, and a prime number P2 sufficiently larger than P1 are prepared, and the i-th label value is denoted as $LH_i$. Then, to the respective labels $L_i$ (i=1, ..., p), different label values each having a size of m bits can be given by the following expression:

```
for (i = 1; i <= p; i++) {
LHi = (P2 * i) % P1;
},
``` where % denotes an operator used for calculating a reminder of division. Otherwise, another arbitrary routine for random number generation may be used.

Figure 4:
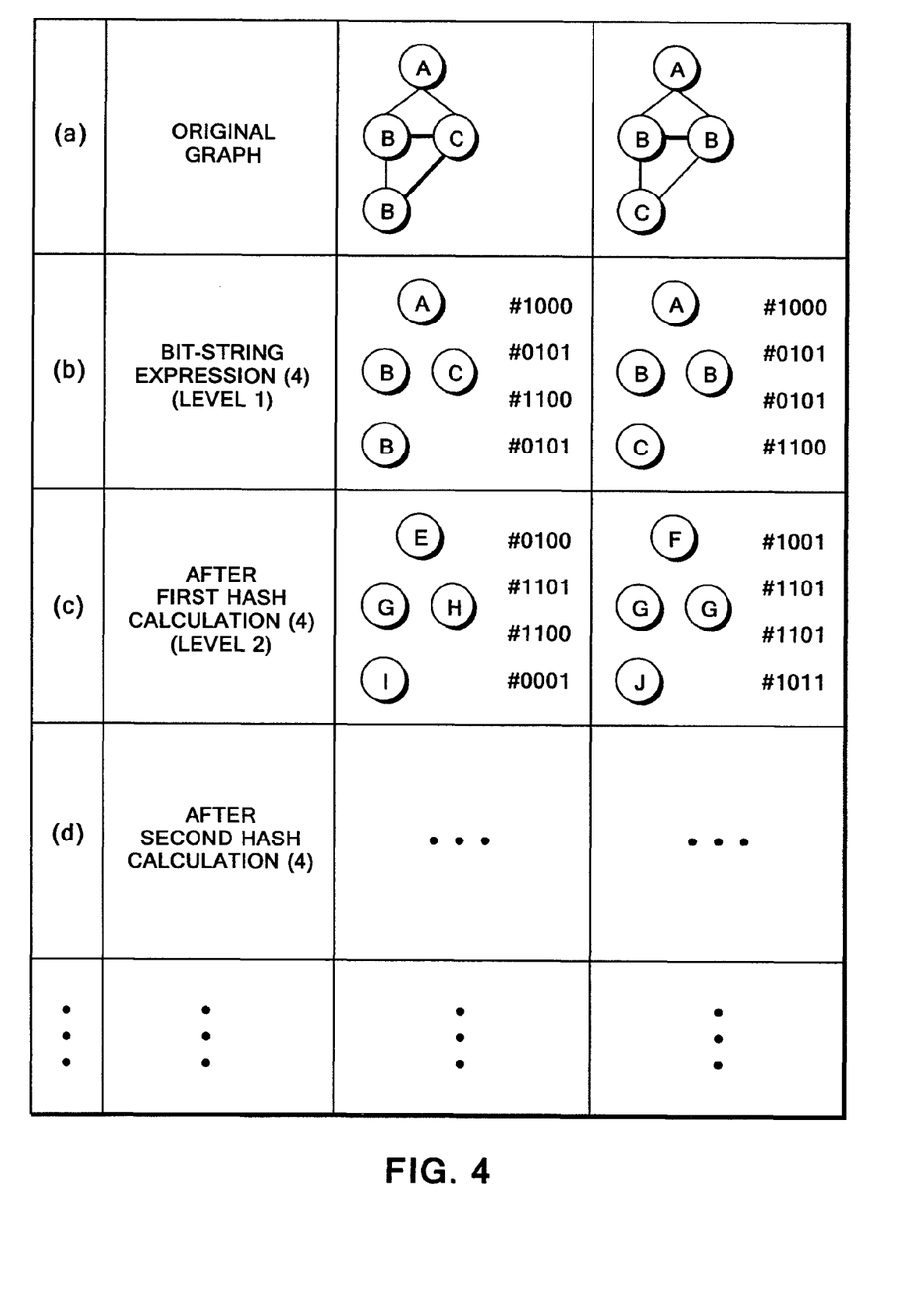
FIG. 4 is a diagram illustrating changes of label values of nodes of graphs, the changes according to calculation steps.

The graph data producing module 202 forms graph data while giving the determined label values $LH_i$ to the respective nodes of the graph in accordance with the respective values $L_i$. That is, with respect to graphs shown in FIG. 4A, the graph data producing module 202 traces each of the graphs, for example, in depth-first order, g.nodelist is sequentially produced, and at the same time, while recording label values $LH_i$ in g.nodelist, records adjacency relations in g.adjacencymatrix. As a result, as shown in FIG. 4B, bit strings are given as the label values to the respective labels. In the example in of FIG. 4B, A=#1000™, B=#0101 and C=#1100. It goes without saying that the label values given to the labels are common between the two graphs. Here, an expression such as #0101 represents a binary number. Each of the label values is preferably configured as a fixed-length number of bits. Although being described later in detail, the reason for the use of the above configuration is the convenience in calculations such as bit rotation, XOR and radix sort.

The formed graph data is loaded onto the main memory 106, or stored in the hard disk drive 108. Otherwise, when the graph data is very large, the graph data may be firstly placed on the hard disk drive 108 and then a part of the graph data may be loaded onto the main memory 106, the part being needed for the calculation.

A graph searching module 206 performs a graph search sequentially and visits all of the nodes of one graph. The graph searching module 206 then refers to nodes adjacent to each node to, while invoking a hash calculation module 208 in relation to the adjacent nodes, perform processing of updating a label value of each node.

Figure 3:
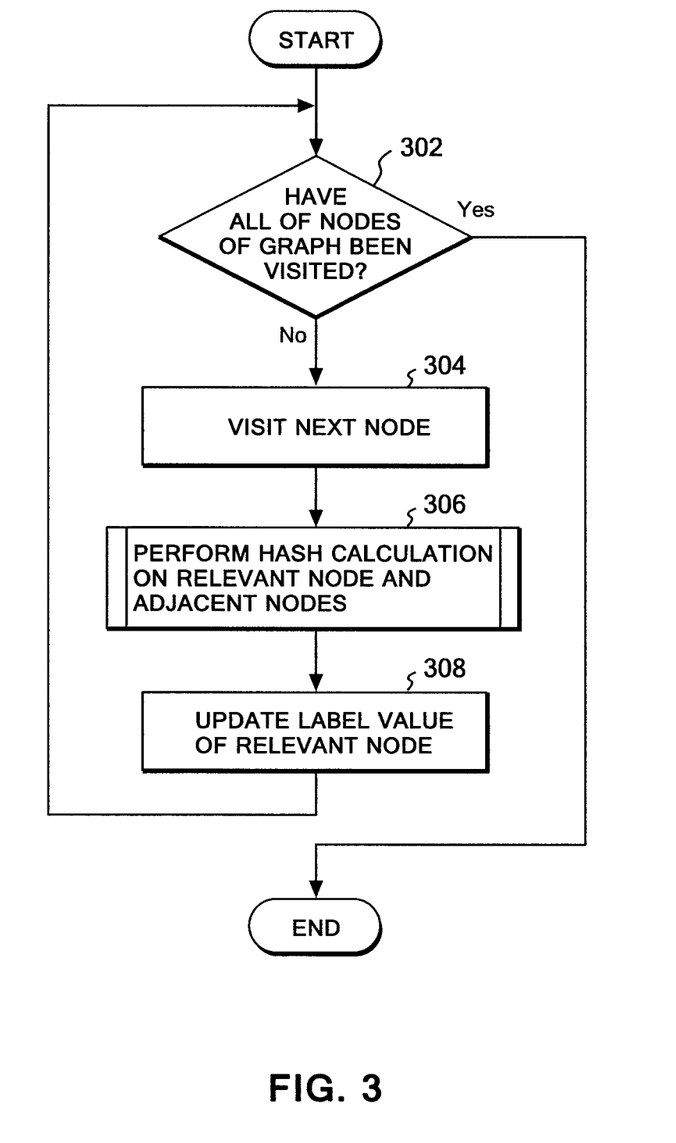
FIG. 3 is a diagram showing a flowchart of processing for calculating label values of nodes of a graph in accordance with the present invention.

FIG. 3 is a flowchart showing processing performed by the graph searching module 206. In FIG. 3, in step 302, the graph searching module 206 determines whether or not it has finished visiting all of the nodes of the graph. This judgment is made based on whether or not the graph searching module 206 has reached the end of g.nodelist.

If it is determined in step 302 that the graph searching module 206 has not yet finished visiting all of the nodes of the graph, the graph searching module 206 visits a subsequent node in accordance with g.nodelist in step 304. In the first stage of the graph search, the graph searching module 206 comes to visit a beginning node.

In step 306, the graph searching module 206 calculates a label value through a hash calculation by using information on nodes adjacent to a relevant node currently visited thereby, the information being obtained by invoking the module 208. Here, the adjacent nodes are nodes directly connected to the relevant node through edges. Such adjacency relations can be checked with reference to values recorded in g.adjacencymatrix. For this calculation, a label value of the relevant node and label values of the adjacent nodes are used. These label values are acquired by referring to g.labellist. The calculation of a label value will be described later in more detail with reference to flowcharts in FIGS. 5, 6 and 7.

In step 308, the graph searching module 206 updates the label value of the relevant node to the calculated label value. Here, although g.labellist may be directly overwritten, it is more preferable that an updated label be written not into g.labellist but into g.labellistx. This is because, if g.labellist is directly overwritten, different results are obtained in cases where different sequences are taken in the same node search.

Subsequently, the processing returns to a judgment in step 302, and steps 304, 306 and 308 are executed until the graph searching module 206 finishes visiting all of the nodes.

When the graph searching module 206 finishes visiting all of the nodes, g.labellistx finishes being rewritten for all of the nodes. Then, g.labellist is replaced by g.labellistx. Such rewrite of label values by visiting a graph is performed for each of the two graphs to be compared to each other. A manner of the conversion is schematically shown in FIG. 4(c).

Processing of such rewrite of label values by visiting a graph is preferably performed plural times as shown in FIG. 4(d) and the like. Generally, this increases a degree of accuracy of the graph comparison. However, an increase in the number of times the processing is performed does not always lead to an increase in the accuracy, and there naturally exists the optimal number of the times.

Returning to FIG. 2, a graph similarity calculation module 210 calculates a degree of similarity between the two graphs on the basis of the rewritten label values. The simplest calculation method for the degree of similarity is to calculate an agreement rate of the rewritten values between the two graphs. Later, a slightly more complicated calculation will be also described.

Figure 5:
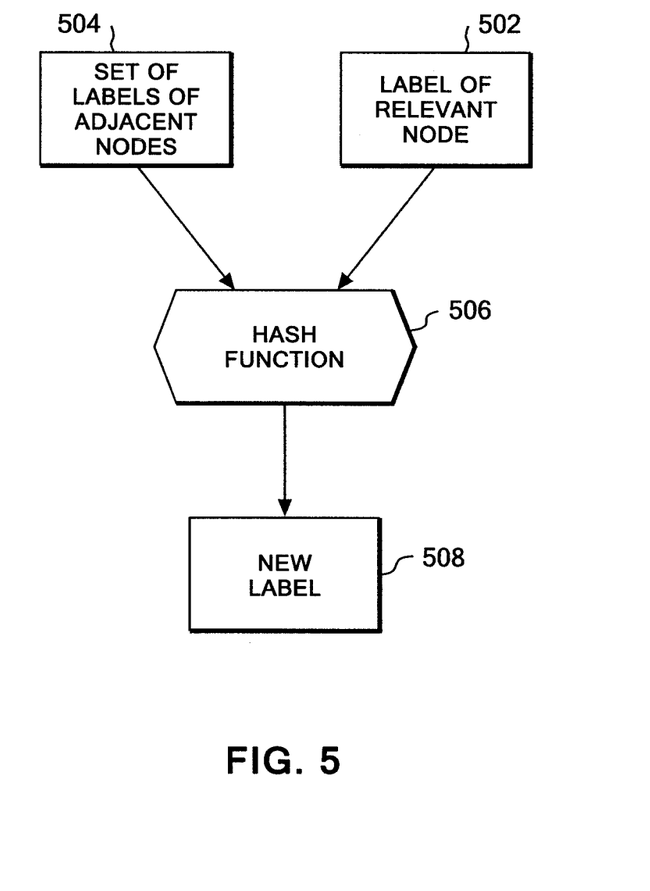
FIG. 5 is a diagram showing a conceptual flowchart illustrating processing of calculating a new label value of a relevant node on the basis of a label of the relevant node and a set of labels of nodes adjacent thereto.

FIG. 5 is a rough flowchart that illustrates, in more detail, processing of the hash calculation module 208 in relation to adjacent nodes.

Assuming that the currently visited node in the flowchart in FIG. 3 is referred to as a relevant node, a label 502 of the relevant node is a label value corresponding to the currently visited node, and is acquired from g.labellist. The label 502 will be expressed as ThisNodeLabel for the sake of convenience.

On the other hand, a set 504 of labels of nodes adjacent to the currently visited node is acquired from g.labellist by referring to values recorded in g.adjacencymatrix. The labels can exist in plurality in general, and therefore will be expressed as NeighboringNodeLabels[ ].

Additionally, if a hush function and a new label 508 are denoted as Hash( ) and NewLabel, respectively, a calculation is made by:

NewLabel=Hash(ThisNodeLabel,NeighboringNode-Labels[ ])

g.labellistx is overwritten by setting a thus calculated value of NewLabel as the label value of the currently visited node.

Figure 6:
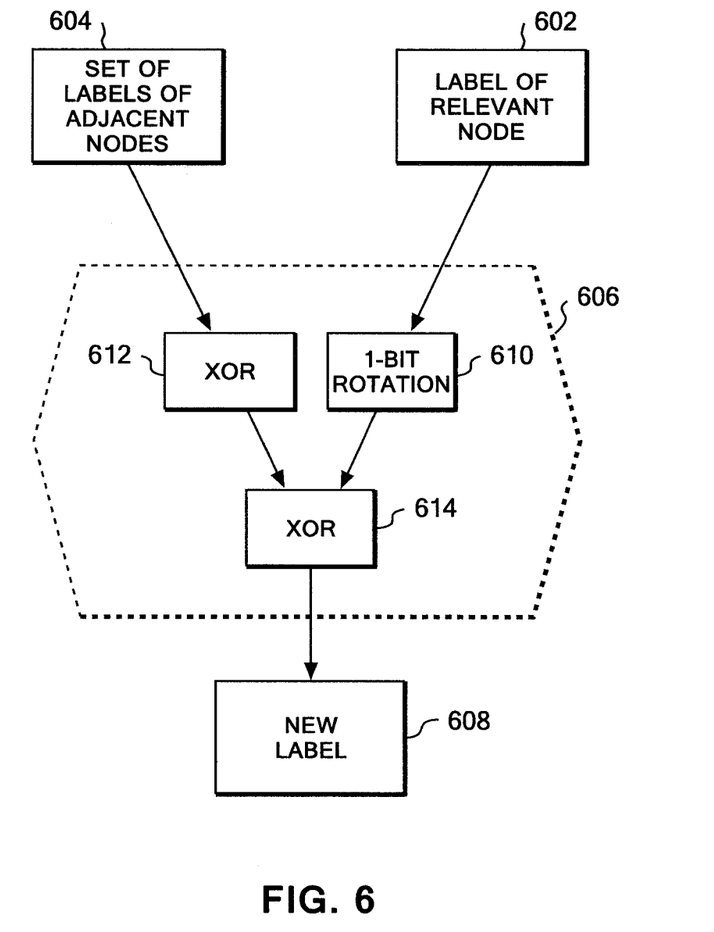
FIG. 6 is a diagram showing a flowchart, according to one example, illustrating processing of calculating a new label value of a relevant node on the basis of a label of the relevant node and a set of labels of nodes adjacent thereto.

FIG. 6 is a diagram showing one example of the processing of FIG. 5. Specifically, in processing of FIG. 6, in order to produce a new label 608 from a label 605 of the relevant node and a set 604 of labels of the adjacent nodes, a hashing block 606 includes: a block 610 that rotates the label 602 of the relevant node by 1 bit; a block 612 that XORs the label set 604 of the adjacent nodes; and a block 614 that XORs an output from the block 610 and an output from the block 612 to obtain the new label 608.

Figure 8:
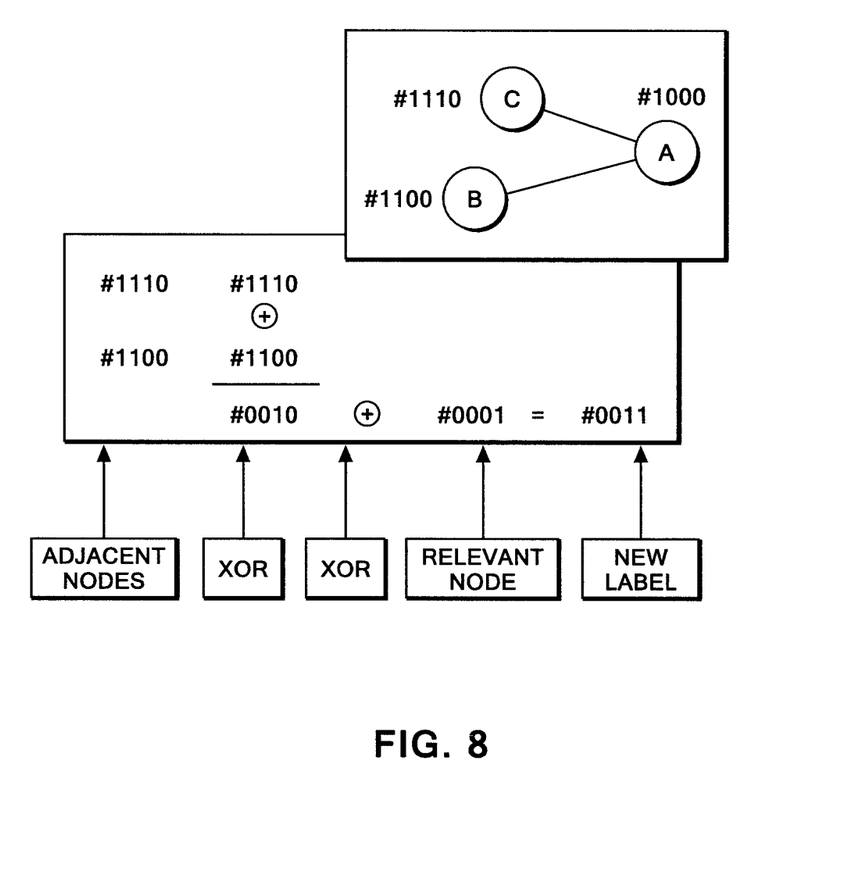
FIG. 8 is a diagram illustrating specific processing of FIG. 6.

FIG. 8 shows a specific calculation example of the processing of FIG. 6. In FIG. 8, suppose a label of the relevant node is #1000, labels of the adjacent nodes are #1110 and #1100, respectively. Then, while an output from the block 612 becomes #0010 through XOR of #1110 and #1100, an output from the block 610 becomes #0001 through 1-bit rotation of #1000. Then, an output from the block 614 that XORs those outputs becomes #0011, which turns out to be the new label of the relevant node.

Figure 7:
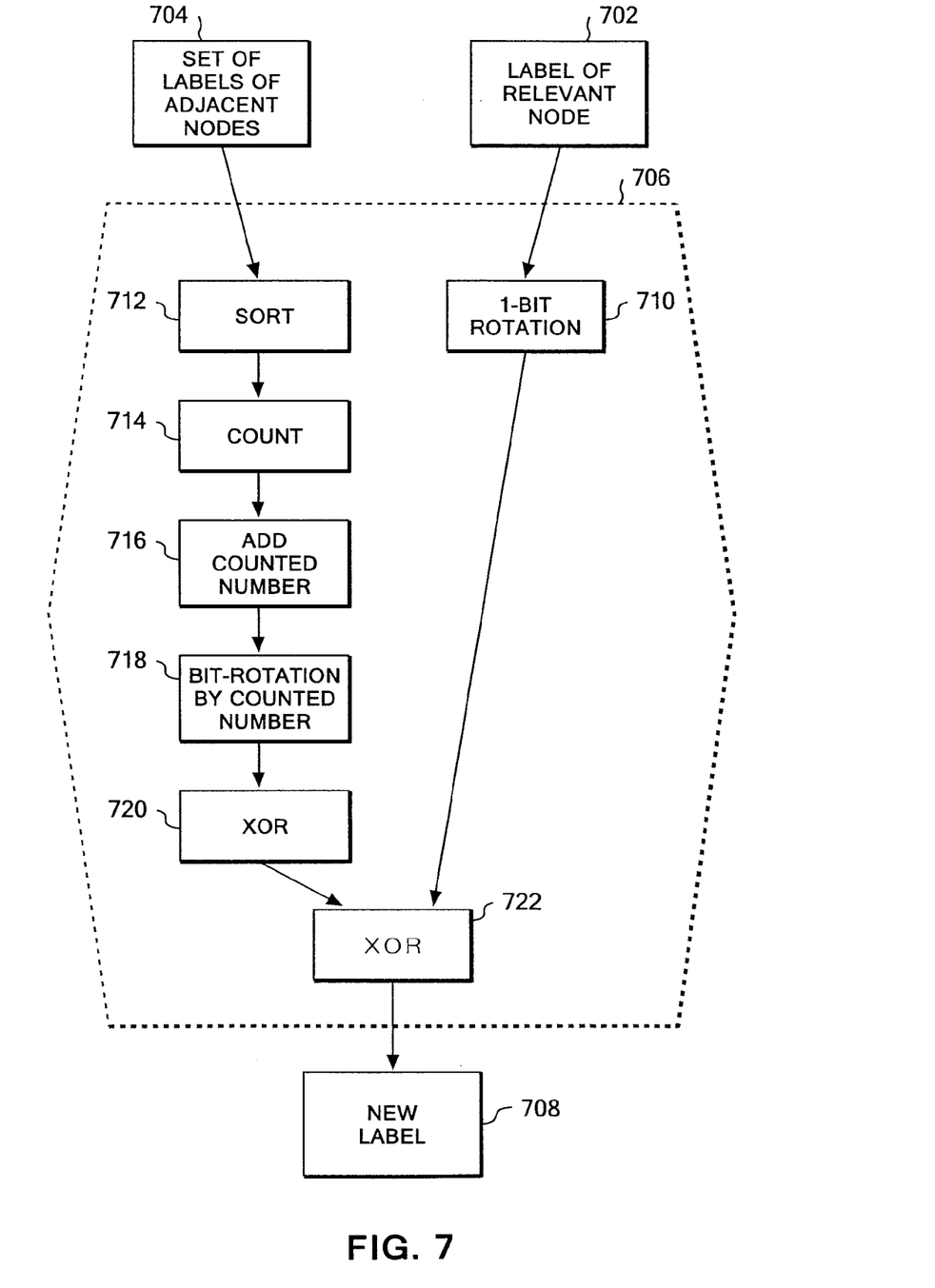
FIG. 7 is a diagram showing a flowchart, according to another example, illustrating processing of calculating a new label value of a relevant node on the basis of a label of the relevant node and a set of labels of nodes adjacent thereto.

FIG. 7 is a diagram showing another example of the processing of FIG. 5. Specifically, in processing of FIG. 7, in order to produce a new label 708 from a label 702 of the relevant node and a set 704 of labels of the adjacent nodes, a hashing block 706 includes: a block 710 that rotates the label 702 of the relevant node by 1 bit; a block 712 that sorts the label set 704 of the adjacent nodes; a block 714 that counts duplications among the sorted outputs; a block 716 that adds the counted values; a block 718 performs bit-rotation by the numbers of bits corresponding to the counted values; a block 720 that XORs outputs obtained by the bit-rotation; and a block 722 that XORs an output from the block 710 and an output from the block 720 to obtain the new label 708.

Note that, since labels are bit strings of a fixed length in the preferable examples, it is convenient that radix sort be used in the sorting performed by the block 712.

Figure 9:
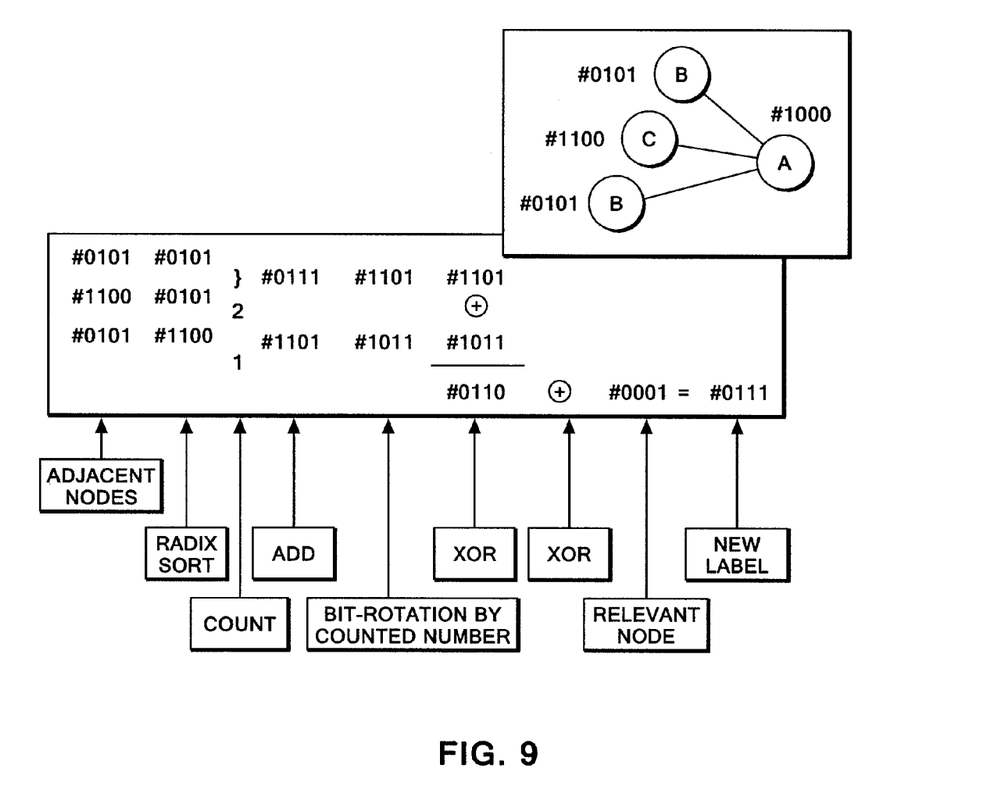
FIG. 9 is a diagram illustrating specific processing of FIG. 7.

FIG. 9 shows a specific calculation example of the processing of FIG. 7. In FIG. 9, suppose a label of the relevant node is #1000, labels of the adjacent nodes are #0101, #1100 and #0101, respectively. Then, the sorted output from the block 712 becomes #0101, #0101 and #1100. Then, the counted outputs from the block 714 become 2 for #0101 and 1 for #1100 since #0101 consecutively appears twice.

Next, the block 716 adds the counted outputs to original values of the labels. While #0101 becomes #0111 with 2 being added thereto, #1100 becomes #1101 with 1 being added thereto.

Next, the block 718 performs bit-rotation thereon by the numbers of bits corresponding to the counted outputs. While #0111 becomes #1101 with 2-bit rotation performed thereon, #1101 becomes #1011 with 1-bit rotation performed thereon.

Next, the block 720 XORs #1101 and #1011, which are values obtained through the bit rotation, and then outputs #0110.

On the other hand, the block 710 outputs #0001 obtained by rotating #1000, which is the label of the relevant node, by 1 bit. Then, the block 722 XORs #0110 outputted from the block 710 and #0001 outputted from the block 720, and #0111 obtained as a result thereof becomes the new label of the relevant node.

Note that an algorithm used for calculating a label value of a relevant node by hashing is not limited to the algorithm shown in FIG. 6 or 7, and any hashing algorithm requiring a reasonable calculation amount and unlikely to cause hash collision can be used. That is, if a set of labels of nodes adjacent to a relevant node and a label of the relevant node are denoted as NeighboringNodeLabels[ ] and ThisNodeLabel, respectively, such a hashing algorithm is a function that takes arguments as follows:

NewLabel=Hash(ThisNodeLabel,NeighboringNode-Labels[ ]).

Consequently, a method can be employed in which: elements of NeighboringNodeLabels[ ] are sorted and then lined up; a result thereof is taken as one number; and a remainder of division of this number by an appropriate prime number P1 is taken as NewLabel. In the case of the example in FIG. 9, NeighboringNodeLabels[ ] consists of #0101, #1100 and #0101, and #010101011100 is obtained by having these elements sorted and lined up. Therefore, a calculation is performed as:

NewLabel=#010101011100 mod P1.

Next, with reference to flowcharts in FIGS. 10 and 11, processing of simultaneously comparing degrees of similarity between two or more plural graphs will be described. Modules used for executing this processing are included in the graph similarity calculation module 210.

Figure 10:
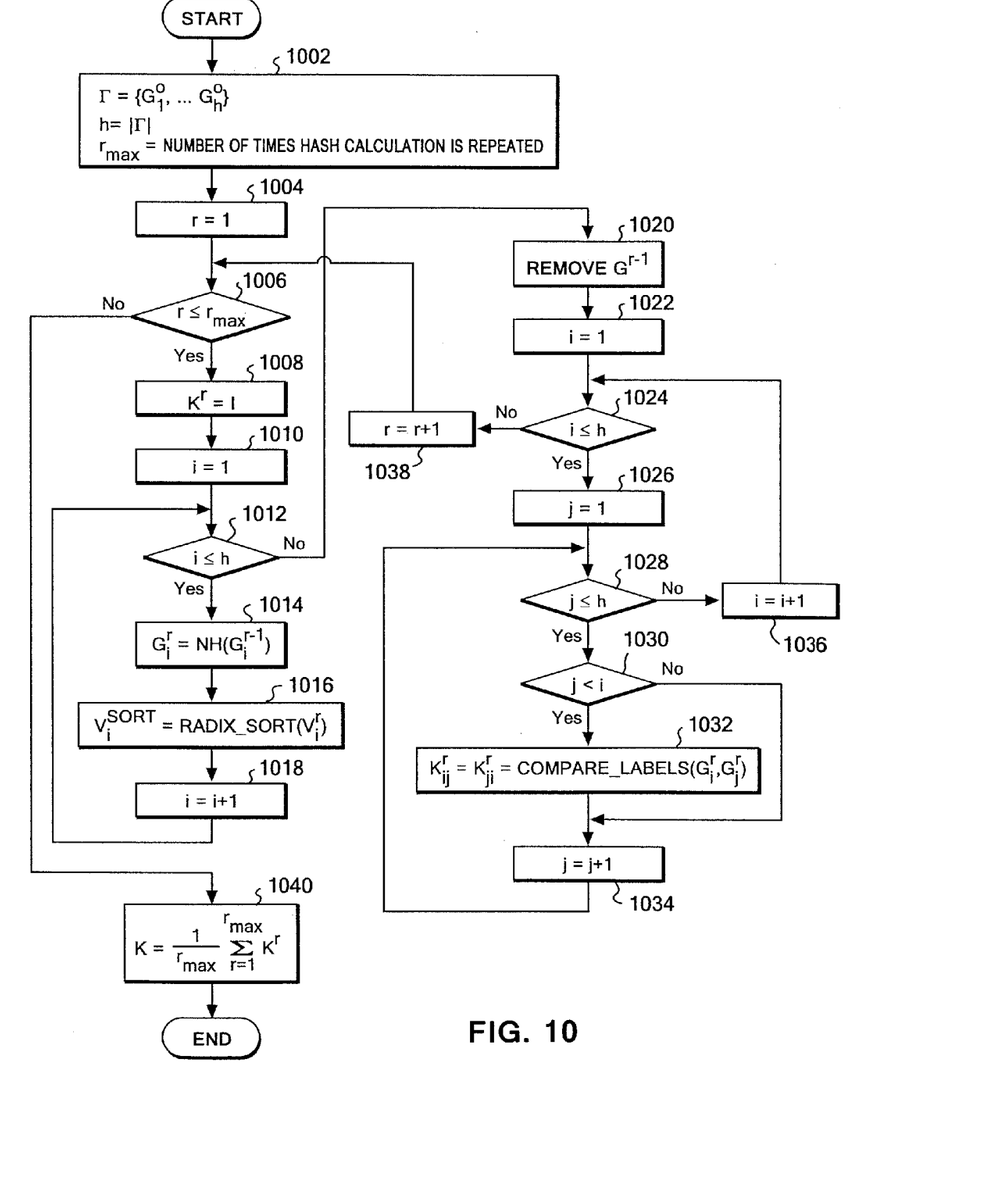
FIG. 10 is a diagram showing a flowchart of processing of collectively comparing plural graphs.
Figure 11:
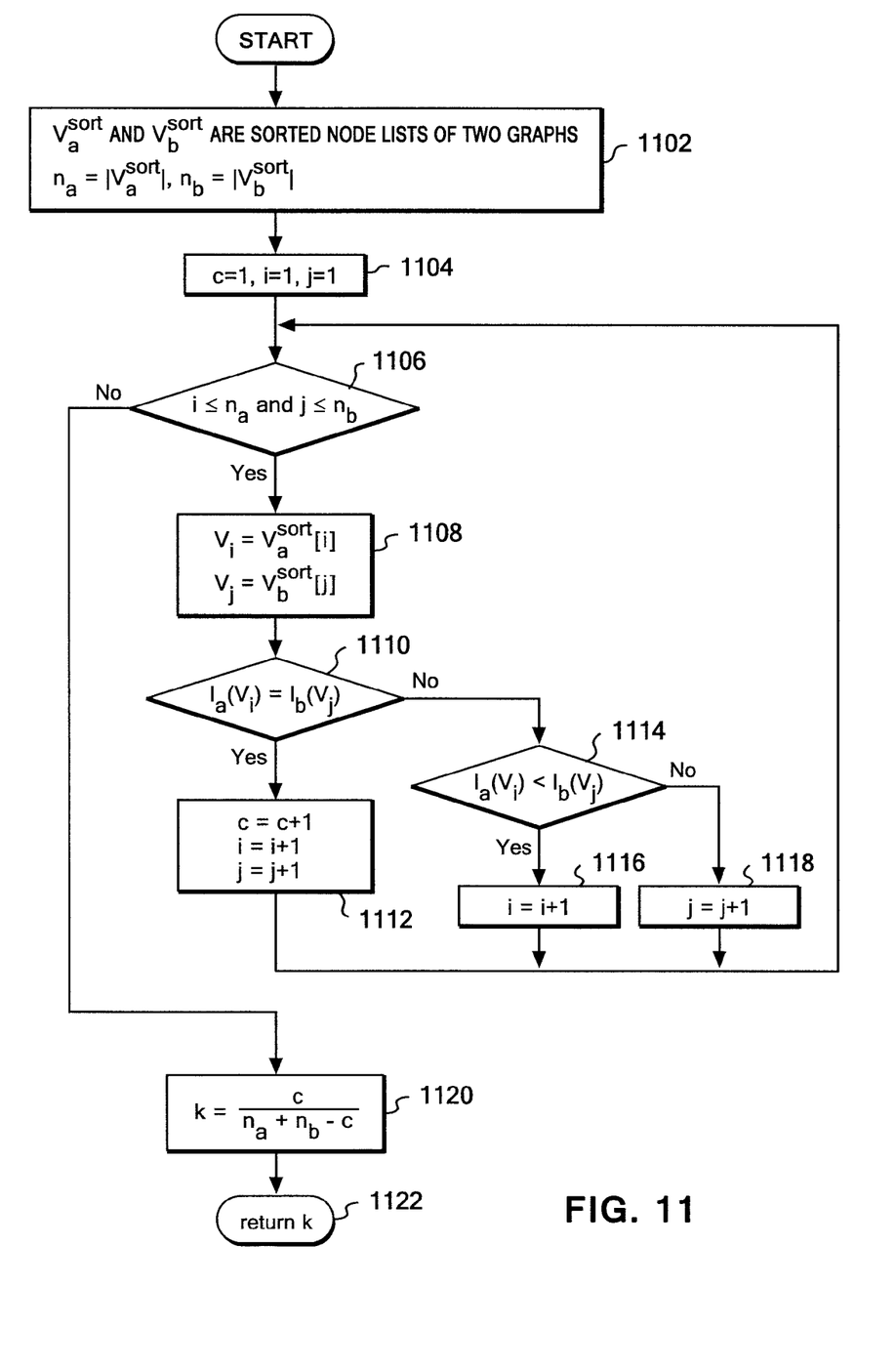
FIG. 11 is a diagram showing a flowchart of processing of a similarity comparison routine invoked in the processing in FIG. 10.

In FIG. 10, in step 1002, h graphs of $\Gamma=\{G_1^0, \ldots, G_h^0\}$ to be compared to each other in similarity are prepared, and data for these graphs are stored in the main memory 106 or the hard disk drive 108. At this point, binary label values of a predetermined number of bits are previously provided to nodes of the graphs by the already-described method.

$h=|\Gamma|$, that is, h denotes the number of graphs. $r_{max}$ is the number of times that the hash calculation is repeated. Although it depends on the case, some number from 3 to 5 is selected as $r_{max}$.

In step 1004, r is set as r=1, and a loop in terms of r until $r_{max}$ is reached is started.

In step 1006, whether or not r<=$r_{max}$ is determined, and, if r<=$r_{max}$, $K^r$ is set as $K^r$=I in step 1008, where I is an h-by-h unit matrix.

In step 1010, i is set as i=1, and a loop in terms of i is started from this point. In step 1012, whether or not i<=h is determined, and, if i<=h, the following equation is executed in step 1014:

$$G_i^r = NH(G_i^r - 1),$$

where $G_i^r$ does not denote $G_i$ to the power of r but denotes a graph having label values obtained as the r-th result of the hush calculation. Additionally, NH( ) denotes a function or a subroutine that executes the processing of the flowchart in FIG. 3. An algorithm used for the hash calculation in relation to adjacent nodes in this case is assumed to be, for example, the one shown in FIG. 7, although it is not limited to that algorithm.

In next step 1016, $V_i^r$ is a node list of $G_i^r$. In step 1016, components of $V_i^r$ are stored in $V_i^{SORT}$ while being lined up in a sequence obtained by radix-sorting the components on the basis of the label values. In step 1018, i is incremented only by 1, and the processing returns to step 1012. That is, until i reaches h, steps 1014, 1016 and 1018 are repeated.

If it is determined in step 1012 that i exceeds h, the processing goes to step 1020, where $G^{r-1}$ is removed. Here, $G^{r-1}$ is a code that collectively denotes $G_1^{r-1}, \ldots, G_h^{r-1}$, and, in short, processing of releasing a region in the main memory is executed, the region having $G_1^{r-1}, \ldots, G_h^{r-1}$ retained therein.

Subsequently, in step 1022, i is set to 1, which implies that a loop in terms of i starts. In step 1024, whether or not i<=h is determined, and, if i<=h, j is set to 1 in step 1026, which implies that a loop in terms of j starts.

In step 1028, whether or not j<=h is determined. If j<=h, whether or not j<i is determined in step 1030. Because step 1032 is symmetric with respect to i and j, this judgment is performed so that duplicative processing may be avoided.

If it is determined in step 1030 that j<i, the processing goes to step 1032, where a calculation expressed as $K_{ij}^r = K_{ji}^r = $ COMPARE_LABELS($G_i^r, G_j^r$) is performed. COMPARE_LABELS( ) is a function that compares labels of two graphs specified by arguments thereof, and then returns a result of the comparison in the form of a real number. Detailed processing contents of the function will be described later with reference to a flowchart in FIG. 11. Additionally, $V_i^{SORT}$ and $V_j^{SORT}$ calculated in step 1016 are used in specific calculations.

In step 1034, j is incremented only by 1, and the processing returns to step 1028, that is, steps 1030, 1032 and 1034 are repeated until j reaches h.

Thus, if it is determined in step 1028 that j exceeds h, i is incremented only by 1 in step in 1036, and then the processing goes to step 1024. If it is determined in step 1024 that i exceeds h, r is incremented only by 1 in step 1038, and the processing returns to step 1006.

If it is determined in step 1006 that r exceeds $r_{max}$, a similarity matrix K is calculated with the following equation, and then the processing ends. An ij component of the similarity matrix K represents a degree of similarity between the graphs $G_i^0$ and $G_j^0$.

$$K = \frac{1}{r_{max}} \sum_{r=1}^{r_{max}} K^r \quad (1)$$

Next, with reference to the flowchart in FIG. 11, processing contents of the function, COMPARE_LABELS( ), used in step 1032 will be described.

In step 1102, $V_a^{SORT}$ and $V_b^{SORT}$ are set as sorted node lists of two graphs, and the orders of $V_a^{SORT}$ and $V_b^{SORT}$ are set as $n_a$ and $n_b$, respectively.

In step 1104, variables c, i and j used in the following steps are set as c=1, i=1 and j=1.

In step 1106, whether or not i<=$n_a$ at the same time as j<=$n_b$ is determined, and, if i<=$n_a$ at the same time as j<=$n_b$, $v_i$ and $v_j$ are set as $v_i = V_a^{SORT}[i]$ and $v_j = V_a^{SORT}[j]$, respectively, in step 1108.

In step 1110, whether or not $l_a(v_i) = l_b(v_j)$ is determined, where $l_a(v_i)$ denotes, for example, a label value of a node that is the i-th component of $Vi_a^{SORT}$.

If it is determined that $l_a(v_i) = l_b(v_j)$, c, i and j are incremented so as to be c+1, i+1 and j+1, respectively, and the processing returns to step 1106.

If it is determined that $l_a(v_i) \neq l_b(v_j)$, the processing goes to step 1114, where whether or not $l_a(v_i) < l_b(v_j)$ is determined. If $l_a(v_i) < l_b(v_j)$, i is incremented only by 1 in step 1116. Otherwise, j is incremented only by 1 in step 1118. In any case, the processing then returns to step 1106.

If it is determined in step 1106 that i>$n_a$ or that j>$n_b$, the processing goes to step 1120, where a degree k of similarity is calculated by use of the following equation:

$$k = \frac{c}{n_a + n_b - c} \quad (2)$$

In step 1122, a value of k thus calculated is returned. In practice, this value is used in step 1032 which is a part that invokes COMPARE_LABELS( ).

While the present invention has been described by means of illustrative embodiments, various changes or modifications can be added to the abovementioned embodiments, and it will be apparent to those who skilled in the art that embodiments to which such changes or modifications are added can also be included in the technical scope of the present invention. For example, while the specific processing shown in any one of FIGS. 6 and 7 has been presented as the hash calculation of a label value that is shown in FIG. 5, these are nothing more than examples, and any hash function requiring a reasonable calculation amount can be used. Additionally, the processing shown in FIG. 11 as an algorithm used for a similarity calculation is also simply one example, and those who skilled in the art should be able to conceive various modification examples on the basis of the number of matching label values of two graphs.

In addition, a degree of similarity between two nodes can be calculated by the present invention in the following manner. That is, suppose subject nodes are denoted as A and B. By extracting two partial graphs including the respective nodes and applying the present invention to the partial graphs, an agreement rate between an updated label of A and an updated label of B can be found and set as the degree of similarity between A and B.

Description of Reference Numerals

202 ... graph data producing module, 204 ... graph data, 206 graph searching module, 208 ... hash calculation module in relation to adjacent nodes

The invention claimed is:

1. A computer implemented method of calculating a degree of similarity between two graphs whose nodes are respectively given discrete labels, the method comprising the steps of:
providing, for each of the two graphs, label values respectively to a given node and nodes adjacent thereto so that different ones of the discrete labels correspond to different ones of the label values;
sequentially tracing the nodes for each of the two graphs;
calculating, during the tracing of the nodes, a new label value through a hash calculation using a label value of a currently visited node and also using label values of nodes adjacent to the currently visited node to update the label value to the currently visited node; and
calculating the degree of similarity between the two graphs on the basis of the number of the label values having been given to nodes of the two graphs and agreeing between the two graphs.

2. The method according to claim 1, wherein the label values are fixed-length bit strings.

3. The method according to claim 2, wherein the hash calculation is performed by XORing two values that are one obtained by bit-shifting the label value of the currently visited node, and one obtained by XORing the label values of the nodes adjacent to the currently visited node.

4. The method according to claim 2, wherein the hash calculation is performed by XORing two values where one is obtained through bit-rotation of the label value of the currently visited node, and another is obtained by: sorting the label values of the nodes adjacent to the currently visited node; counting the numbers of duplications among these label values; adding the thus counted numbers respectively to these label values; rotating the resultant values by the respective counted numbers of bits; and XORing the resultant values.

5. The method according to claim 4, wherein the sorting is radix sorting.

6. The method according to claim 1, wherein:
one of the two graphs is a first partial graph including a first node in a given graph, and the other one of the two graphs is a second partial graph including a second node in the given graph; and
the calculated degree of similarity between the two graphs is regarded as a degree of similarity between the first node and the second node.

7. A computer implemented system calculating a degree of similarity between two graphs whose nodes are respectively given discrete labels, the system comprising:
means for providing, for each of the two graphs, label values respectively to a given node and nodes adjacent thereto so that different ones of the discrete labels correspond to different ones of the label values;
means for sequentially tracing the nodes for each of the two graphs;
means for calculating, during the tracing of the nodes, a new label value through a hash calculation using a label value of a currently visited node and also using label values of nodes adjacent to the currently visited node to update the label value to the currently visited node; and
means for calculating the degree of similarity between the two graphs on the basis of the number of the label values having been given to nodes of the two graphs and agreeing between the two graphs.

8. The system according to claim 7, wherein the label values are fixed-length bit strings.

9. The system according to claim 8, wherein the hash calculation is performed by XORing two values where one is obtained by bit-shifting the label value of the currently visited node, and another is obtained by XORing the label values of the nodes adjacent to the currently visited node.

10. The system according to claim 8, wherein the hash calculation is performed by XORing two values that are obtained through bit-rotation of the label value of the currently visited node, and obtained by: sorting the label values of the nodes adjacent to the currently visited node; counting the numbers of duplications among these label values; adding the thus counted numbers respectively to these label values; rotating the resultant values by the respective counted numbers of bits; and XORing the resultant values.

11. The system according to claim 10, wherein the sorting is radix sorting.

12. The system according to claim 7, wherein:
one of the two graphs is a first partial graph including a first node in a given graph, and the other one of the two graphs is a second partial graph including a second node in the given graph; and
the calculated degree of similarity between the two graphs is regarded as a degree of similarity between the first node and the second node.

13. A non-transitory computer readable storage medium comprising a computer readable program that calculates, by processing with a computer, a degree of similarity between two graphs whose nodes are respectively given discrete labels, the program causing the computer to execute the steps of:
giving, for each of the two graphs, label values respectively to a given node and nodes adjacent thereto so that different ones of the discrete labels correspond to different ones of the label values;
sequentially tracing the nodes for each of the two graphs;
calculating, during the tracing of the nodes, a new label value through a hash calculation using a label value of a currently visited node and also using label values of nodes adjacent to the currently visited node to update the label value to the currently visited node; and
calculating the degree of similarity between the two graphs on the basis of the number of the label values having been given to nodes of the two graphs and agreeing between the two graphs.

14. The program according to claim 13, wherein the label values are fixed-length bit strings.

15. The program according to claim 14, wherein the hash calculation is performed by XORing two values that are obtained by bit-shifting the label value of the currently visited node, and obtained by XORing the label values of the nodes adjacent to the currently visited node.

16. The program according to claim 14, wherein the hash calculation is performed by XORing two values that are obtained through bit-rotation of the label value of the currently visited node, and obtained by: sorting the label values of the nodes adjacent to the currently visited node; counting the numbers of duplications among these label values; adding the thus counted numbers respectively to these label values; rotating the resultant values by the respective counted numbers of bits; and XORing the resultant values.

17. The program according to claim 15, wherein the sorting is radix sorting.

18. The program according to claim 13, wherein:
one of the two graphs is a first partial graph including a first node in a given graph, and the other one of the two graphs is a second partial graph including a second node in the given graph; and
the calculated degree of similarity between the two graphs is regarded as a degree of similarity between the first node and the second node.

* * * * *